No. 837,150. PATENTED NOV. 27, 1906.
J. THOMSON.
WHEEL.
APPLICATION FILED SEPT. 16, 1905.
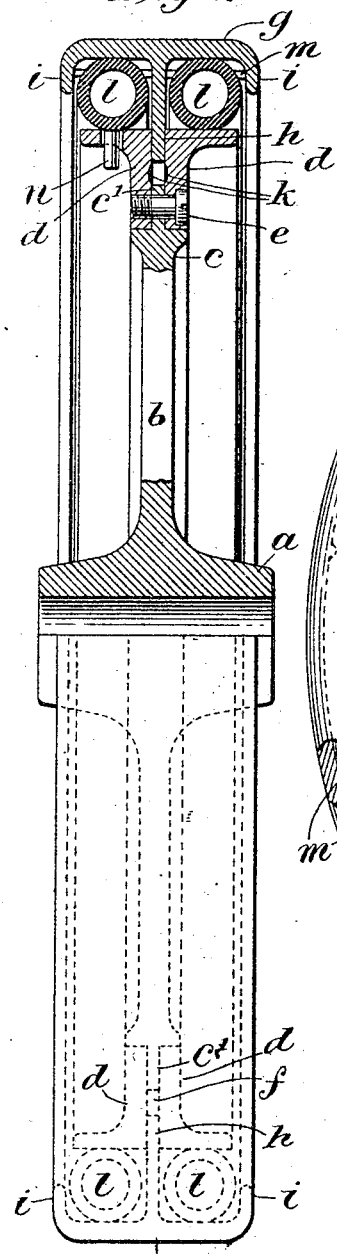
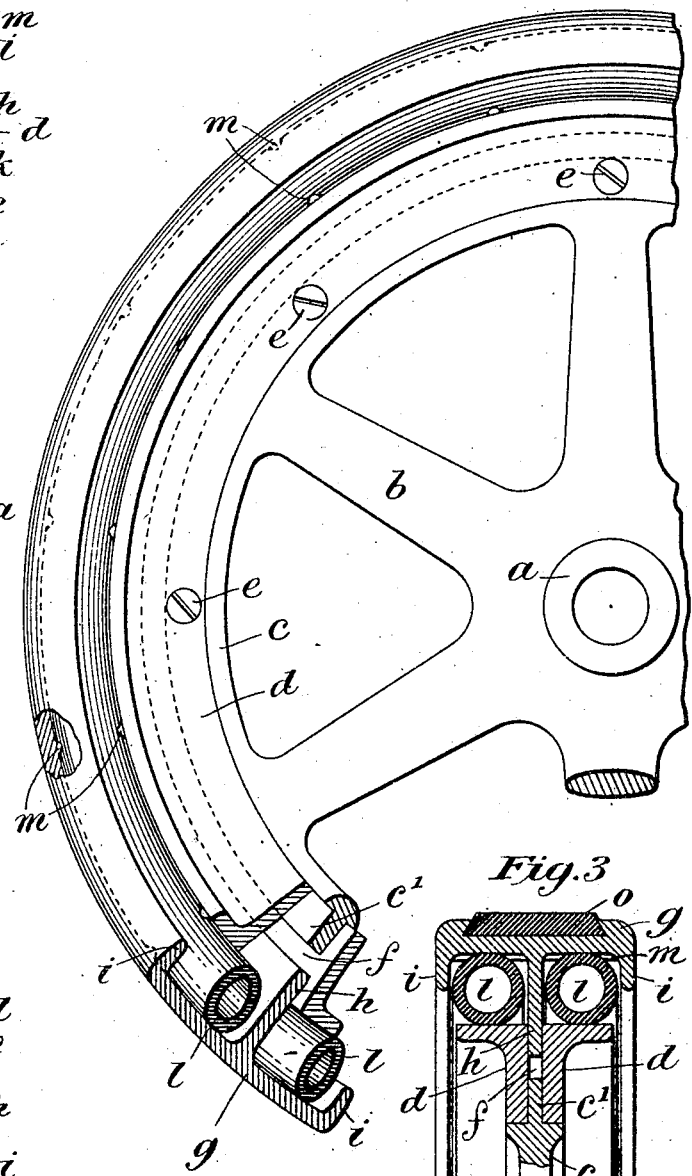
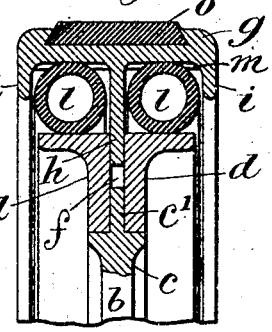
Witnesses:
M. A. Brayley.
O. L. O'Shea
Inventor:
John Thomson
by Redding, Kiddle & Greeley
Attys.

UNITED STATES PATENT OFFICE.

JOHN THOMSON, OF NEW YORK, N. Y., ASSIGNOR TO TRIDENT TIRE COMPANY, OF NEW YORK, N. Y., A CORPORATION OF NEW YORK.

WHEEL.

No. 837,150. Specification of Letters Patent. Patented Nov. 27, 1906.

Application filed September 16, 1905. Serial No. 278,705.

*To all whom it may concern:*

Be it known that I, JOHN THOMSON, a citizen of the United States, residing in the borough of Manhattan, city of New York, in the State of New York, have invented certain new and useful Improvements in Wheels, of which the following is a specification, reference being had to the accompanying drawings, forming a part hereof.

This invention relates to the construction of wheels, more particularly such as are adapted for use on automobiles and other vehicles, and especially to the tire portion or road-bearing portion of such wheels.

Cushioned wheels, as is well understood, usually have their elastic tires applied to their outer peripheries and making contact directly with the road-surface. It has been proposed in some cases to provide a metallic shield for such a tire in order to protect it from puncture and from excessive wear, such shields being made up of a succession of independent plates. Tires provided with such shields, however, fail to stand the test of long use. It has also been proposed to provide such wheels outside of the elastic or cushion portions of the tires with endless annular tires of metal which are intended to save the elastic portions of the tires from excessive wear and to prevent puncture.

The present invention is more particularly concerned with wheels of the character last referred to; and it has for its object to provide a wheel of improved construction in which the cushion portion of the tire of any suitable elastic resilient material is interposed between the felly and the solid continuous inelastic bearing-tire of metal in such a manner that all side or wrenching thrusts shall be borne entirely by the metal tire and the felly to the exclusion of the elastic or cushion portion of the tire, while the metal tire is at the same time perfectly cushioned, and its axial center can be universally shifted with respect to the axial center of the wheel against the resilient material. The metal tire of course acts as a shield to protect the cushion portion of the tire from injury.

The invention will be more fully explained hereinafter with reference to the accompanying drawings, in which it is illustrated as embodied in a convenient and practical structure, and in which—

Figure 1 is a partial view, in side elevation, of a wheel which embodies the invention, parts being broken away to illustrate details of construction. Fig. 2 is a view, partly in central section and partly in edge elevation, of the wheel shown in Fig. 1. Fig. 3 is a partial view, in central section, illustrating a slight modification.

The hub $a$ and main body $b$ of the wheel may be of any usual or suitable construction, the body of the wheel being provided with a felly $c$, which is preferably adapted for the application of side plates $d$, one on each side thereof, which may be held in position when assembled by suitable bolts $e$. As will be observed, the side plates $d$ project radially beyond the central rib $c'$ of the felly to form an annular slot or channel $f$. The metallic tire $g$, which is formed, as usual, as a continuous annular band, is provided with an inwardly-projecting rib $h$, preferably located centrally, adapted to enter and move freely in the annular slot or channel $f$. The metallic tire is also provided, preferably on each side of the central rib $h$ and at the outer edges, with inwardly-projecting flanges $i$. Chambers for a suitable lubricant may be provided, if desired, as at $k$, in the opposed faces of the side plates $d$.

The cushion portions of the tire, preferably pneumatic tubes $l$, are interposed between the side plates $d$ and the inner face of the tire $g$, one at each side of the rib $h$. If frictional adhesion between the tubes and the side plates $h$ at the inner surfaces of the tubes and the tire $g$ at the outer surfaces of the tubes is insufficient to prevent creeping of the tire upon the felly, then, if desired, transverse ribs may be formed on the outer faces of the side plates and the inner face of the metallic tire $g$, as at $m$, to indent the elastic or cushion portions $l$ of the tire and prevent circumferential movement of such tubes and of the metallic tire $g$ with respect to the wheel. If pneumatic tubes are used, the valved inflation-nipples may be projected through holes formed in the side plates, as at $n$. If it be desired also to cushion the initial metallic shock of the tire $g$ upon the roadway, a band $o$ of solid rubber or other suitable material may be applied to the periphery of the tire $g$, as shown in Fig. 3.

In assembling the several parts the pneumatic tubes or other cushion portions $l$ are sprung into their respective recesses in the solid tire g, which is then properly placed with relation to the body b of the wheel. The side plates d are then pressed into place, preferably compressing slightly the cushion portions l, and are held in place by the bolts e. The proportions of the parts are preferably such that the tubes l shall under ordinary conditions be free at their sides, but shall bear snugly against the outer faces of the side plates and the inner faces of the tire g, respectively, so that they shall thereby act as a seal to prevent dust and grit from reaching the center rib h and its bearing. It will be understood that in use the tire g moves axially with respect to the body of the wheel as the cushion portion is compressed at the lower portion of the wheel and is expanded at the upper portion of the wheel, the rib h moving freely in the slot f, the tubes or cushion portion expanding, as determined by the pressure, into the enlarged spaces, which are specially provided to accommodate such expansion within the encompassing walls of the side plates and tire. Should the pneumatic tubes collapse, the inner face of the rib h will lie in contact with the outer face of the felly c, thereby protecting the pneumatic tubes from harmful crushing, while at the same time the wheel continues to be usable. It is hardly possible, however, that both tubes should collapse at the same time, so that by reason of the provision of a plurality of pneumatic tubes when one collapses there still remains in reserve another which will possess at least half of the efficiency of both. Furthermore, as the load is sustained by and distributed over a much larger area of the cushion portion of the tire than when the cushion portion is not encircled by an inelastic tire the air-pressure within the tire may be considerably less This permits a cheaper tire to be used, and the cost thereof is still further reduced in view of the fact that the use of a plurality of tubes permits each tube to be much smaller and to have but a fractional portion of the strength of the usual exposed pneumatic tire. Moreover, the rib h of the tire coöperating with the side plates d resists all of the side thrusts which would otherwise tend to wrench the pneumatic tire and force it from the felly.

I claim as my invention—

1. The combination of a wheel-body having a narrow felly, side plates detachably secured against said felly and forming between them a circumferential slot or channel, a metallic tire having an inwardly-projecting rib engaging said slot or channel with a free bearing, and a cushion interposed between one of said side plates and said tire, substantially as described.

2. The combination of a wheel-body having a narrow felly, side plates secured against said felly and forming between them a circumferential slot or channel, a metallic tire having an inwardly-projecting central rib engaging said slot or channel with a free bearing, and cushions interposed between said side plates and said tire on opposite sides of said rib, substantially as described.

This specification signed and witnessed this 15th day of September, 1905.

JOHN THOMSON.

In presence of—
THOMAS J. CANTY,
W. B. GREELEY.